April 8, 1958      A. D. PAULL      2,829,802

COMPOSITE METAL AND PLASTIC COLLAPSIBLE TUBE

Filed April 15, 1955

INVENTOR.
AMBROSE D. PAULL.

BY *Christy, Parmelee & Strickland*

ATTORNEYS.

United States Patent Office 2,829,802
Patented Apr. 8, 1958

2,829,802

COMPOSITE METAL AND PLASTIC COLLAPSIBLE TUBE

Ambrose D. Paull, Wheeling, W. Va., assignor to Wheeling Stamping Company, Wheeling, W. Va., a corporation of West Virginia Application April 15, 1955, Serial No. 501,459

4 Claims. (Cl. 222—92)

This invention is for a collapsible tube and relates to such a tube having a body of metal and a separate neck of plastic and a method of making same.

It has heretofore been proposed to form metal collapsible tubes with plastic necks, this being desirable for many reasons, but the difficulty of attaching the necks to the tubes and the expense of making the assembly have been obstacles to their extensive use.

An object of the present invention is to provide a composite tube in which a tight seal is made between the metal and plastic, and one which is less expensive to assemble. It is also better adapted to machine assembly operations.

My invention may be more fully understood by reference to the accompanying drawings, in which.

Figure 1:
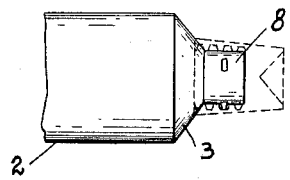
Fig. 1 is a side elevation of the neck end of a collapsible tube embodying my invention.
Figure 2:
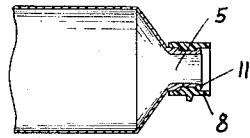
Fig. 2 is a longitudinal section through Fig. 1.
Figure 3:
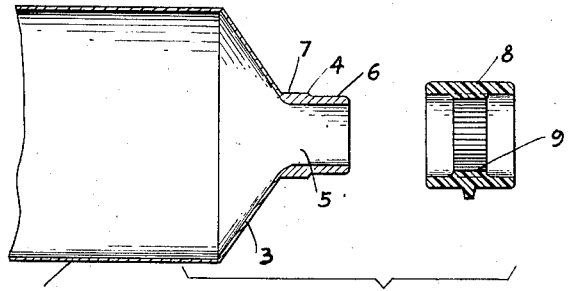
Fig. 3 is an enlarged exploded section through the metal tube and plastic nipple before assembly, but in relation to be assembled.
Figure 4:
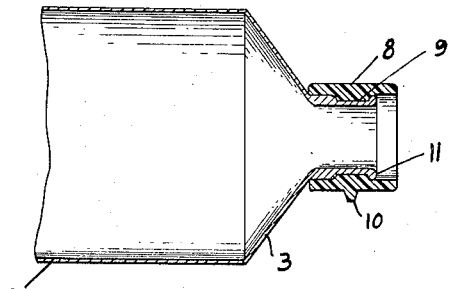
Fig. 4 is a similar enlarged section through the assembly.

Referring to the drawings, 2 designates the usual body of metal collapsible tube having a shoulder 3 at one end. This shoulder is provided with a neck 4 having a passageway 5 therethrough, and the terminal portion 6 of the neck is preferably of slightly reduced diameter. If desired, the terminal portion 6 or the heavier portion 7, or both, may be slightly knurled.

On the neck is secured a molded plastic nipple 8. As shown in Figs. 1 to 4 the nipple is of generally cylindrical form, and has an axial opening therethrough. The interior of the nipple is provided with a restricted mid portion 9 which is knurled and which is slightly shorter in its axial extent than the reduced terminal 6 of the tube. The restricted mid portion is centered in the nipple so that the nipple is reversible end for end.

The outside of the nipple is provided with three equidistantly spaced lugs 10 around the middle of its periphery. These are to engage the threads of a cap having a three lead screw, the cap being indicated in dotted lines in Fig. 1.

The tube is formed of any of the metals usually used for collapsible tubes, as lead, tin and aluminum. The nipple may be formed of phenolic resin, styrene, urea-formaldehyde, or it may be formed of "nylon," polyesters, or other thermoplastic resins. In assembling the tube, the nipple is forced onto the neck of the tube over which it has a close fit while the tube is held on a mandrel. To embed the knurling into the metal an appropriate tool may subsequently be inserted in the metal neck to expand the metal and force it into the knurled surface. As heretofore explained the end portion 6 need not be reduced, and the knurling will effect the necessary displacement of the metal to give the effect of a reduced neck in the finished tube. The end of the tube neck will extend outwardly beyond the knurled area, and it is then swedged or flared over, as indicated at 11, forming a seal and holding the nipple against endwise movement.

One important advantage of the nipple is that being reversible end for end, the tube may be assembled by machinery, and no problem of getting the nipple oriented end-for-end is involved. It is because of this that the lugs 10 and the knurled area 9 must be centered midway of the ends of the nipple. Lugs are preferred to an external thread because they are equally effective with a three lead thread on the cap, and present less difficulty in molding, since the nipple can be molded in two similar complementary molds with the lugs 10 at the parting line of the molds.

Figure 5:
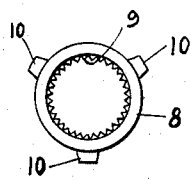
Fig. 5 is an end view of the nipple before its application to the tube.
Figure 6:
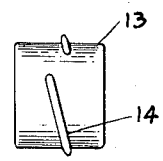
Fig. 6 is an elevation of a modified form of neck member.

However, as shown in Fig. 5 where the nipple designated 13, is otherwise the same, a single turn thread 14 may be molded onto the exterior of the nipple, should a thread be preferred to lugs. This single thread extending about seven-eighths of a turn about the nipple, permits endwise separation of properly formed mold parts, and being centered on the nipple, permits the nipple to be reversed.

In the assembled tube, the metal does not extend to the end of the tube; a tight seal which will preclude leakage of essential oils from the material packed in the tube is provided, and the plastic and metal are firmly interlocked. If the nipple is formed of a sufficiently soft plastic, no liner is required in the cap, which will then seat and seal directly on the end of the nipple.

The knurling may extend to the full depth of the restricted portion 9, in which case, as indicated above, little or no reduction of the terminal 6 of the tube neck is required before applying the nipple to the tube, the knurling simply forcing the metal away, but if the knurling in 9 is not the full depth of the restriction, which may be preferable to secure a tight seal under the turned-over end 11 of the tube, a slight reduction of the diameter of the neck of the tube, as here shown, is desired, but in any case, the knurling of the nipple should gouge and embed itself into the metal neck of the tube.

The tube as thus formed meets the needed requirements for a plastic neck tube, and is one that may be economically produced and which eliminates many problems in the mechanical assembly of such tubes and the forming of the parts.

While I have shown and described the specific construction of the parts, it will be understood that variations may be made in the exact construction herein specifically disclosed to meet the demands of the trade, without departing, however, from my invention.

I claim:

1. A collapsible tube having a body with a shoulder and a neck at one end thereof, a hollow plastic nipple slidably force-fitted onto said neck into engagement with said shoulder, an area of reduced internal diameter on the innerface of the hollow nipple and intermediate the ends thereof, knurling on the inner face of said area and embedded into said tube neck during assembly of the nipple therewith, an annular internal shoulder on the nipple at one end of the knurled area, and the outer end of the tube neck flared over said shoulder restricting relative longitudinal movement between the neck and the nipple.

2. A collapsible tube having a metal body with an integral shoulder at one end, a neck projecting axially from the shoulder, a hollow plastic nipple surrounding the neck and extending beyond the outer end thereof, an internal longitudinally extending knurled area on said nipple reducing the diameter of the opening in the nipple and disposed in inward spaced relation to the outer end of the nipple, said knurled nipple area having a force-fit longitudinally over the end of said tube neck and embedded into the metal thereof, and the outer end of the tube neck being flared over the outer end of the nipple knurled area, restricting outward movement of the nipple.

3. A collapsible tube having a metal body, a shoulder integral with one end of the body, a metal neck extending axially of said body from said shoulder, said neck having an outer end portion of reduced outer diameter, a hollow plastic nipple slidably force-fitted onto said neck into fixed relation therewith, an internal longitudinally extending knurled area of reduced internal diameter on said nipple intermediate the ends thereof and of less longitudinal length than that of the reduced neck portion, and the outer end of said neck being flared over the end of said nipple knurled area in spaced relation to the outer end of the nipple.

4. A collapsible tube having a metal body, a shoulder integral with one end of the body, a metal neck extending axially of said body from said shoulder, a hollow plastic nipple slidably force-fitted onto said neck into fixed relation therewith, an internal longitudinally extending area on said nipple intermediate the ends thereof and of an internal diameter smaller than the outer diameter of said neck, knurling on said nipple area of reduced internal diameter throughout the length thereof and extending inwardly for substantially the depth thereof, the outer end of said neck end portion being flared over the outer end of said nipple area of reduced internal diameter and in spaced relation to the outer end of the nipple.

References Cited in the file of this patent

UNITED STATES PATENTS

| | | |
|---|---|---|
| 1,157,666 | Bennett | Oct. 26, 1915 |
| 2,184,712 | Fleissig | Dec. 26, 1939 |
| 2,326,809 | White | Aug. 17, 1943 |
| 2,364,109 | Taylor | Dec. 5, 1944 |
| 2,550,070 | La Brecque et al. | Apr. 24, 1951 |

FOREIGN PATENTS

| | | |
|---|---|---|
| 512,158 | Great Britain | Aug. 30, 1939 |
| 705,329 | Great Britain | Mar. 10, 1954 |